(12) United States Patent
VanDeLaare et al.

(10) Patent No.: US 9,759,922 B2
(45) Date of Patent: Sep. 12, 2017

(54) NONCONDUCTIVE POSITION VERIFICATION SYSTEMS FOR DEVICES UTILIZING MAGNETIC SENSORS

(71) Applicant: The Boeing Company, Chicago, IL (US)

(72) Inventors: Dean Richard VanDeLaare, Apache Junction, AZ (US); Matthew Prokopowicz, Gilbert, AZ (US); Dominic James Macchiaroli, Scottsdale, AZ (US); Stephen Mohammed, Phoenix, AZ (US); Morgan E. Cook, Gilbert, AZ (US); Jeffrey Steven Veselovsky, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 370 days.

(21) Appl. No.: 14/337,720

(22) Filed: Jul. 22, 2014

(65) Prior Publication Data

US 2016/0025986 A1    Jan. 28, 2016

(51) Int. Cl.
*G09G 5/00* (2006.01)
*G02B 27/01* (2006.01)
(Continued)

(52) U.S. Cl.
CPC ......... *G02B 27/0176* (2013.01); *G05B 15/02* (2013.01); *G09B 9/12* (2013.01);
(Continued)

(58) Field of Classification Search
CPC ........ G02B 27/0176; G02B 2027/0123; G02B 2027/0143; G02B 2027/0159; G05B 15/02; G09B 9/12; G09B 9/307
See application file for complete search history.

(56) References Cited

U.S. PATENT DOCUMENTS

| 5,223,776 | A | * | 6/1993 | Radke | ...................... B25J 13/02 200/5 R |
| 5,980,256 | A | * | 11/1999 | Carmein | ................ A63B 22/02 434/29 |

(Continued)

OTHER PUBLICATIONS

RobotSled, photgraphs pp. 1-24.

*Primary Examiner* — Peter D McLoone
(74) *Attorney, Agent, or Firm* — Duft Bornsen & Fettig LLP

(57) ABSTRACT

Systems and methods are provided for verifying a magnetic positioning system. One embodiment includes a mounting unit, a drive unit, and a controller. The mounting unit is able to mechanically couple with a device that includes a magnetic sensor. The mounting unit includes a nonconductive mount to attach to the device, and a nonconductive swivel bearing with arms that are rotatably attached to the mount. The drive unit includes a platform, a nonconductive rigid post extending outward from the platform and attached to a center portion of the swivel bearing, linear actuators attached to the platform, and nonconductive shafts attached to the arms of the swivel bearing. Each shaft is attached to a linear actuator for displacement by the actuator. The controller directs the linear actuators to adjust the nonconductive shafts in order to move the swivel bearing, thereby adjusting an orientation and position of the device.

20 Claims, 21 Drawing Sheets

(51) Int. Cl.
  *G05B 15/02* (2006.01)
  *G09B 9/30* (2006.01)
  *G09B 9/12* (2006.01)

(52) U.S. Cl.
  CPC ...... *G09B 9/307* (2013.01); *G02B 2027/0123* (2013.01); *G02B 2027/0143* (2013.01); *G02B 2027/0159* (2013.01)

(56) References Cited

U.S. PATENT DOCUMENTS

| | | | | |
|---|---|---|---|---|
| 6,839,972 | B2* | 1/2005 | Jackson | G01B 11/002 33/203.18 |
| 7,046,215 | B1* | 5/2006 | Bartlett | G01S 5/163 345/8 |
| 2006/0164073 | A1* | 7/2006 | Bergsma | G01R 33/0206 324/202 |
| 2010/0091377 | A1* | 4/2010 | Hedges | A42B 3/04 359/630 |

* cited by examiner

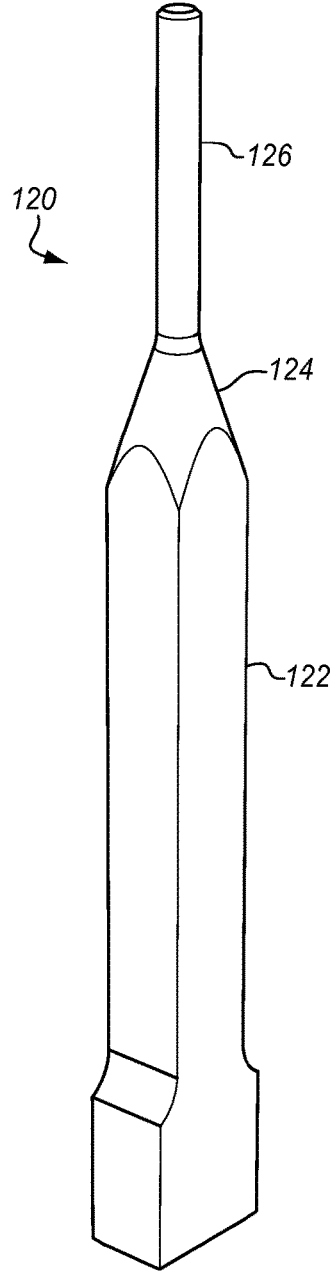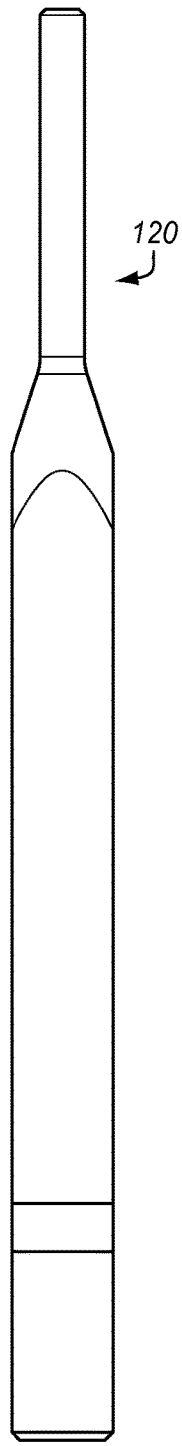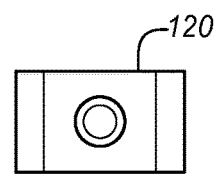
FIG. 11
FIG. 12
FIG. 13

NONCONDUCTIVE POSITION VERIFICATION SYSTEMS FOR DEVICES UTILIZING MAGNETIC SENSORS

FIELD

The disclosure relates to the field of position tracking systems, and in particular, to systems for verifying the output of a magnetic position tracking system.

BACKGROUND

Position tracking systems are used for a variety of purposes. For example, helmet tracking systems may be used in an aircraft in order to determine the position and/or orientation (i.e., rotation) of a pilot's head. This data may then be utilized to update a Heads-Up Display (HUD) in order to properly display information within in the pilot's current field of view.

Position tracking systems may be implemented within an aircraft, within a simulator for an aircraft, or in any suitable environment where careful tracking of position is desirable (e.g., in a surgical environment, for a video game system, etc.). One type of position tracking system monitors the orientation of a user's head by attaching magnetic sensors to a helmet for the user, and attaching magnetic transmitters close to the user in the surrounding environment. Communications between these magnetic sensors and transmitters may then be used to determine an orientation and position of the head.

SUMMARY

Embodiments described herein utilize equipment for calibrating a magnetic position tracking system, such as a helmet tracking system for an aircraft. The equipment includes nonconductive components in locations that are close to magnetic sensors of the tracking system. This limits the amount of signal distortion caused by the equipment that is used to calibrate the magnetic position tracking system.

One embodiment is a system that verifies the output of a magnetic positioning system. The system includes a mounting unit, a drive unit, and a controller. The mounting unit is able to mechanically couple with a device that includes a magnetic sensor. The mounting unit includes a nonconductive mount to attach to the device, and a nonconductive swivel bearing with arms that are rotatably attached to the mount. The drive unit includes a platform, a nonconductive rigid post extending outward from the platform and attached to a center portion of the swivel bearing, linear actuators attached to the platform, and nonconductive shafts attached to the arms of the swivel bearing. Each shaft is attached to a linear actuator for displacement by the actuator. The controller directs the linear actuators to adjust the nonconductive shafts in order to move the swivel bearing, thereby adjusting an orientation and position of the device.

Another embodiment is a method. The method includes a) directing linear actuators to move nonconductive shafts that are each attached via a mounting unit to a device that includes a magnetic sensor, thereby moving the device into a default orientation and position, and b) analyzing input from a camera attached to the device in order to confirm that the device is at the default orientation and position. The method also includes c) recording input from the magnetic sensor in the memory and correlating the input with the orientation and position of the device, and d) determining whether input for positions and orientations in an expected range of motion of the device have been recorded in the memory. If input for positions and orientations in the expected range of motion have not yet been measured, the method further includes e) directing the linear actuators to move the nonconductive shafts again, thereby moving the device into a new orientation and position, and f) returning to step c).

Another embodiment is an apparatus. The apparatus includes a nonconductive mounting unit, adapted to mechanically couple with a device that includes a magnetic sensor. The apparatus also includes a drive unit. The drive unit includes nonconductive shafts attached to the mounting unit, and linear actuators adapted to drive the nonconductive shafts. The apparatus also includes a controller operable to direct the linear actuators to controllably adjust the nonconductive shafts, thereby adjusting an orientation and position of the device.

Other exemplary embodiments (e.g., methods and computer-readable media relating to the foregoing embodiments) may be described below. The features, functions, and advantages that have been discussed may be achieved independently in various embodiments or may be combined in yet other embodiments further details of which may be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIGS. 11-13 are diagrams of a rigid center post in an exemplary embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The systems described herein help to verify/calibrate magnetic position tracking systems that may be vulnerable to magnetic field interference from the surrounding environment. For example, an aircraft cockpit utilizing a magnetic position tracking system (hereinafter, "magnetic positioning system") may be substantially metallic. These metallic cockpit components, which change depending on the given aircraft, vary the magnetic environment in which the positioning system is to be used. Even across aircraft of the exact same model, each cockpit presents a unique magnetic environment (e.g., depending on what happens to be mounted in that specific cockpit). To address this issue, the equipment described herein is capable of reliably and precisely moving a device (e.g., a helmet, armband, etc.) into a variety of known orientations and positions (e.g., within a cockpit), allowing for the known positions to be correlated with magnetic sensor input for the positioning system.

Figure 1:
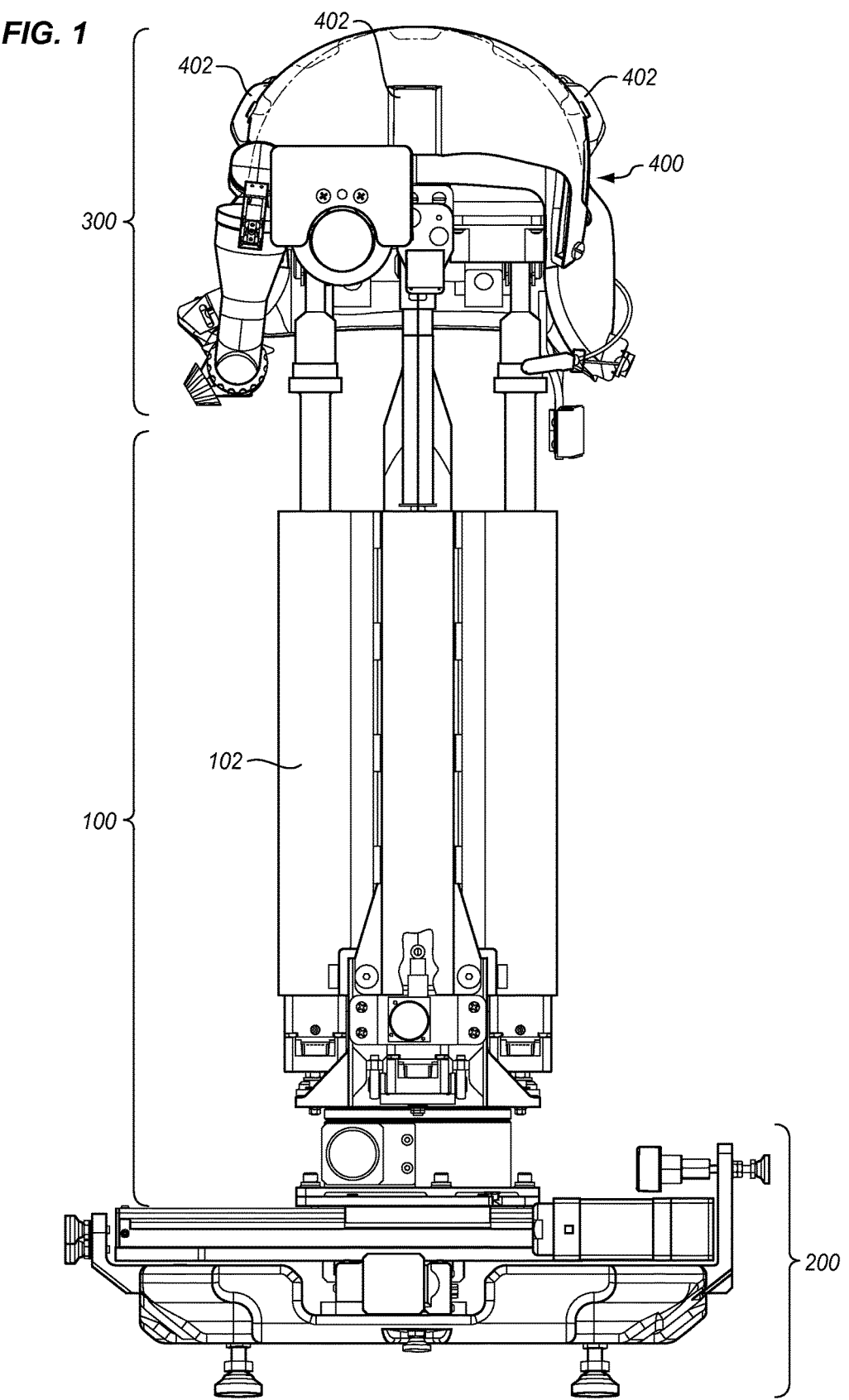
FIG. 1 is a diagram of a position verification system in an exemplary embodiment.
Figure 2:
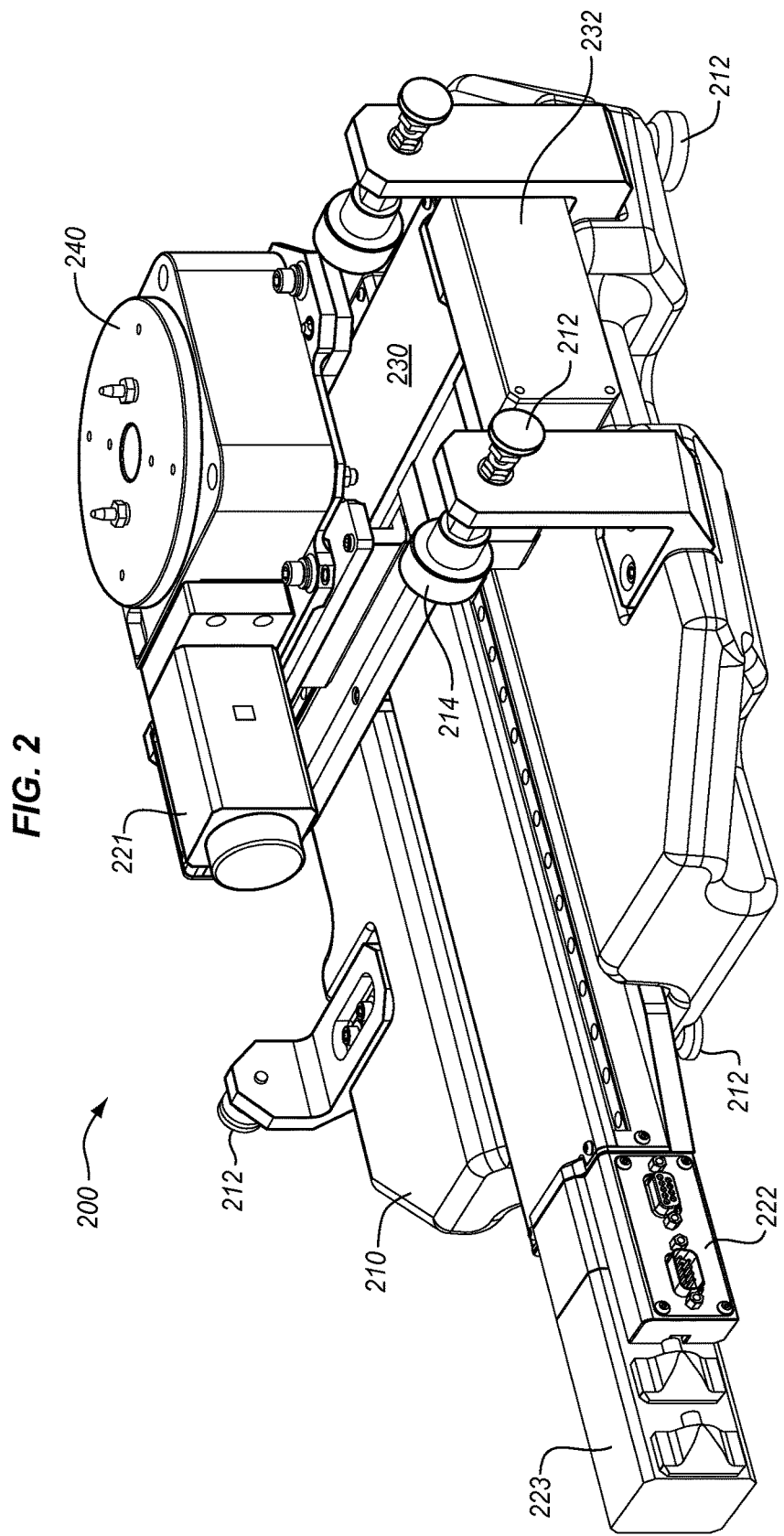
FIGS. 2-6 are diagrams of a base unit of a position verification system in an exemplary embodiment.
Figure 3:
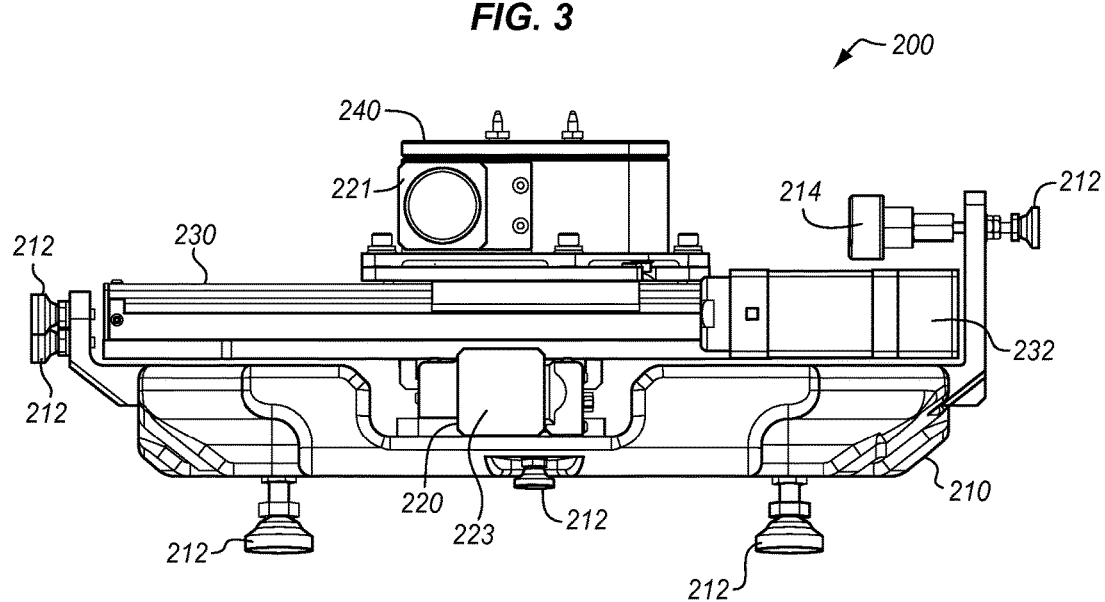
Figure 4:
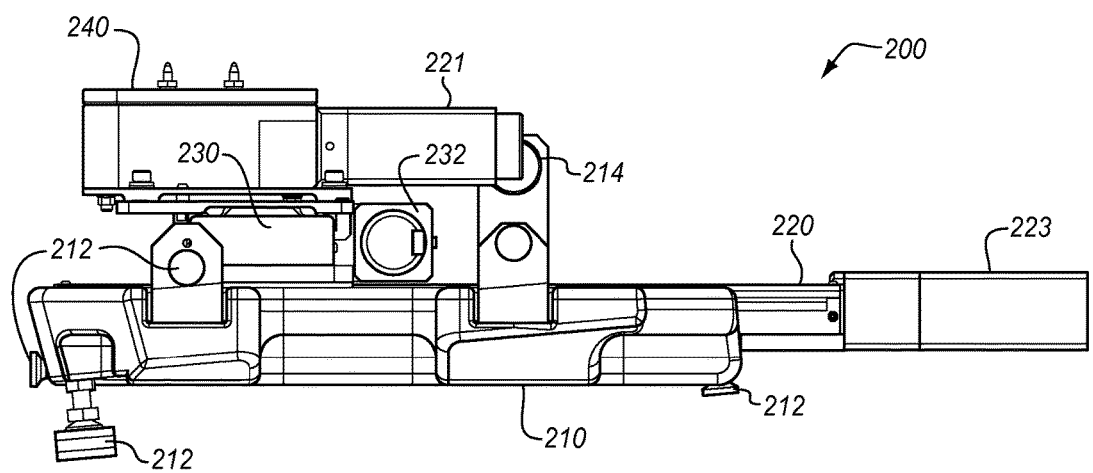
Figure 5:
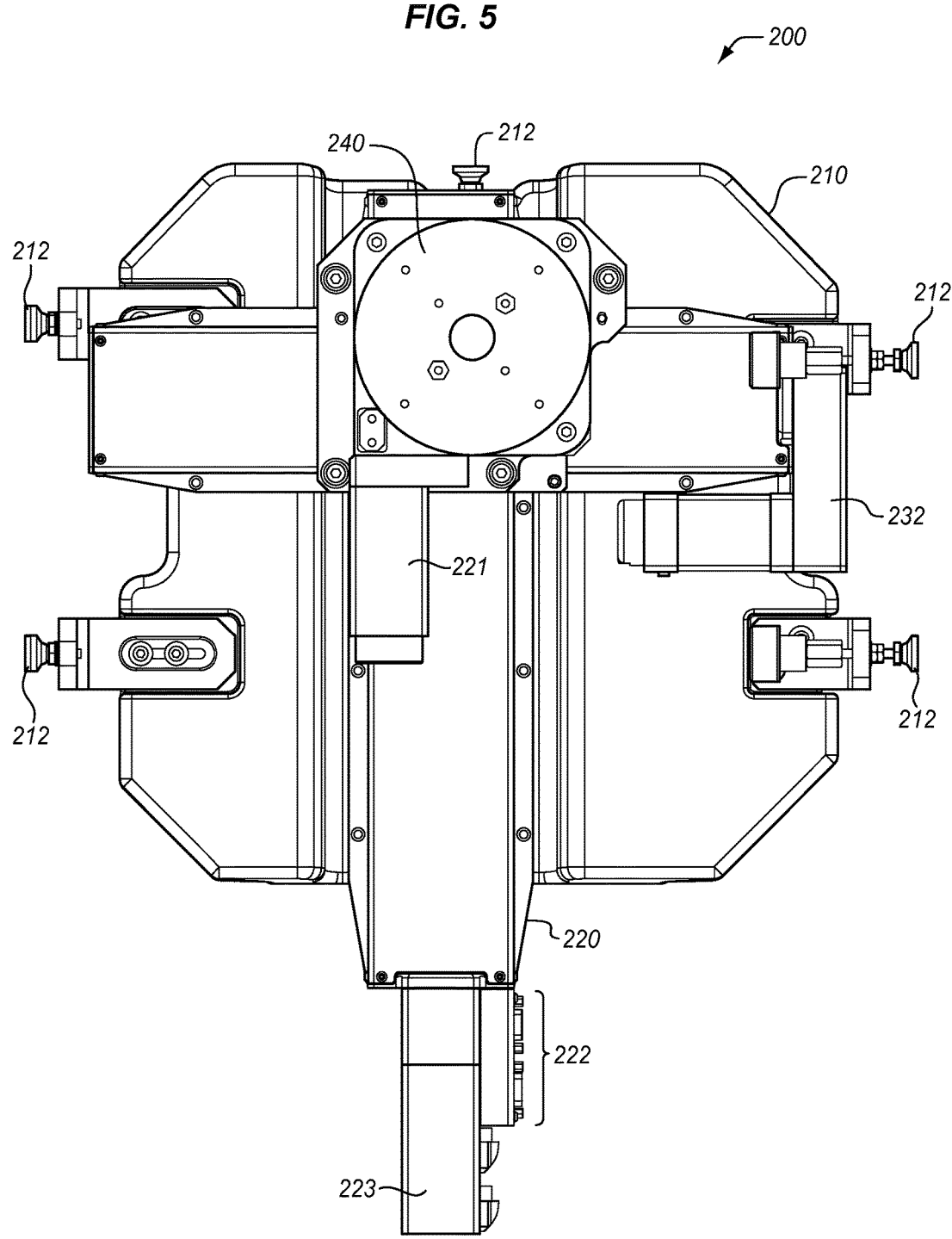
Figure 6:
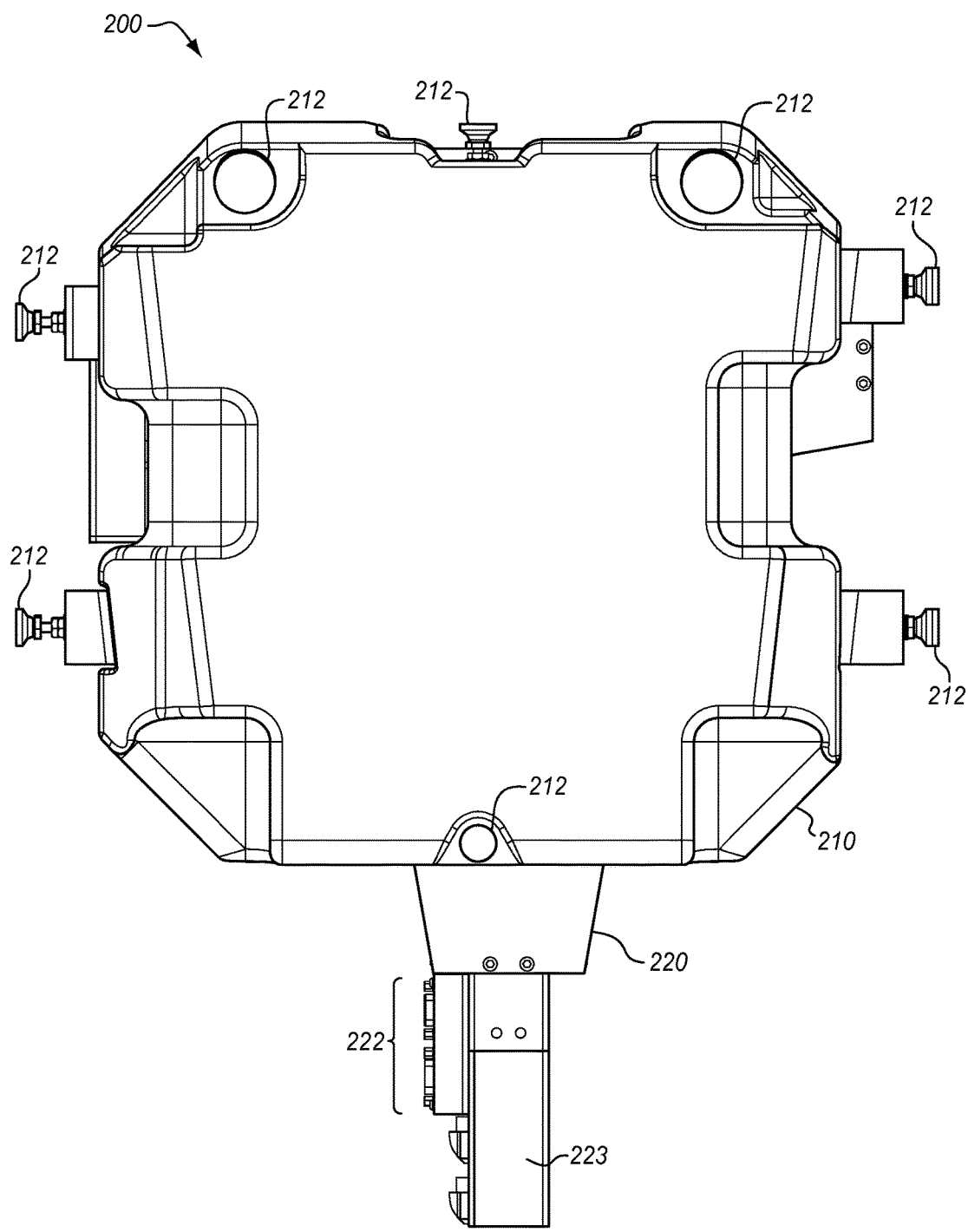
Figure 7:
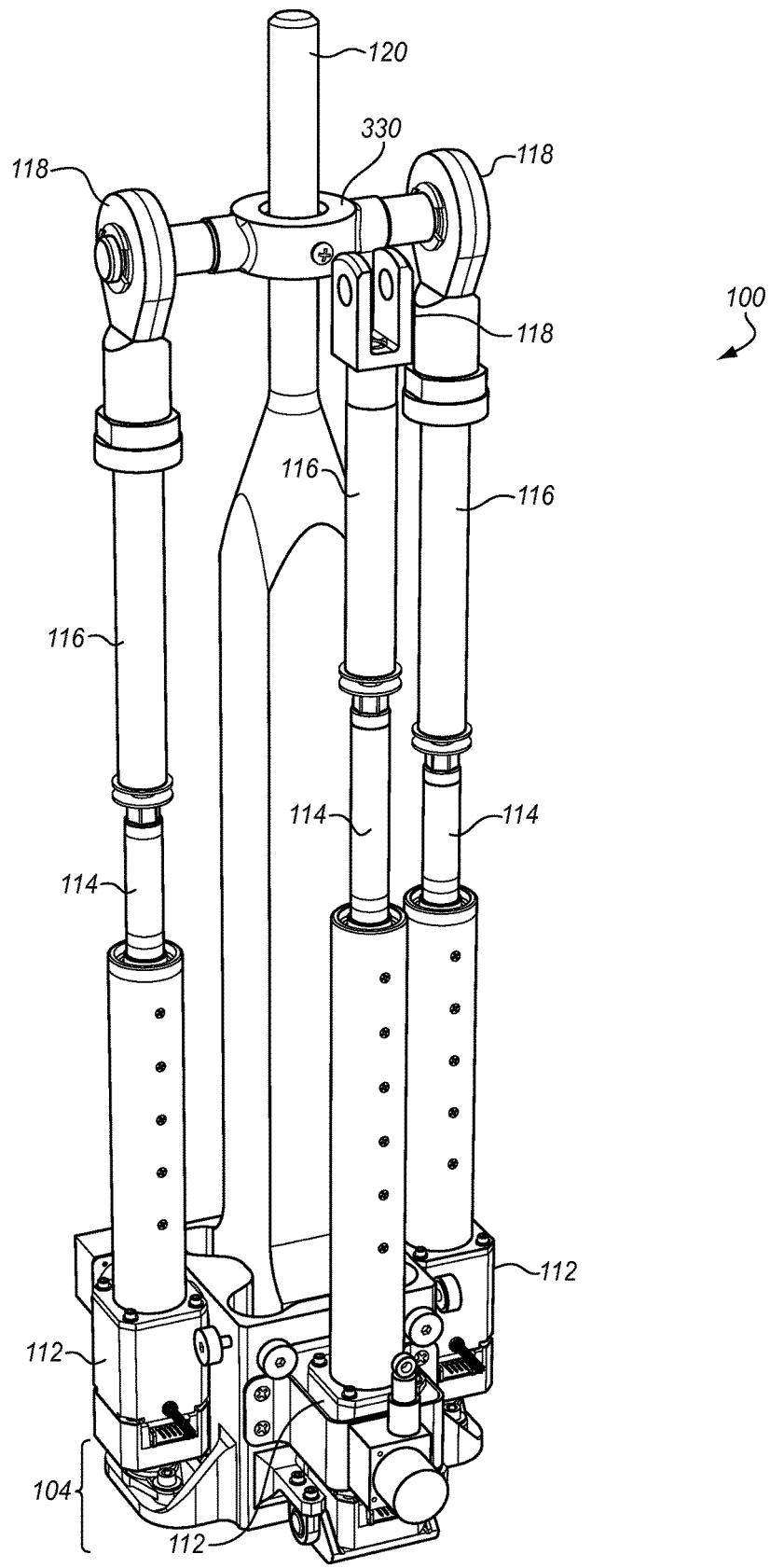
FIGS. 7-10 are diagrams of a drive unit of a position verification system in an exemplary embodiment.
Figure 8:
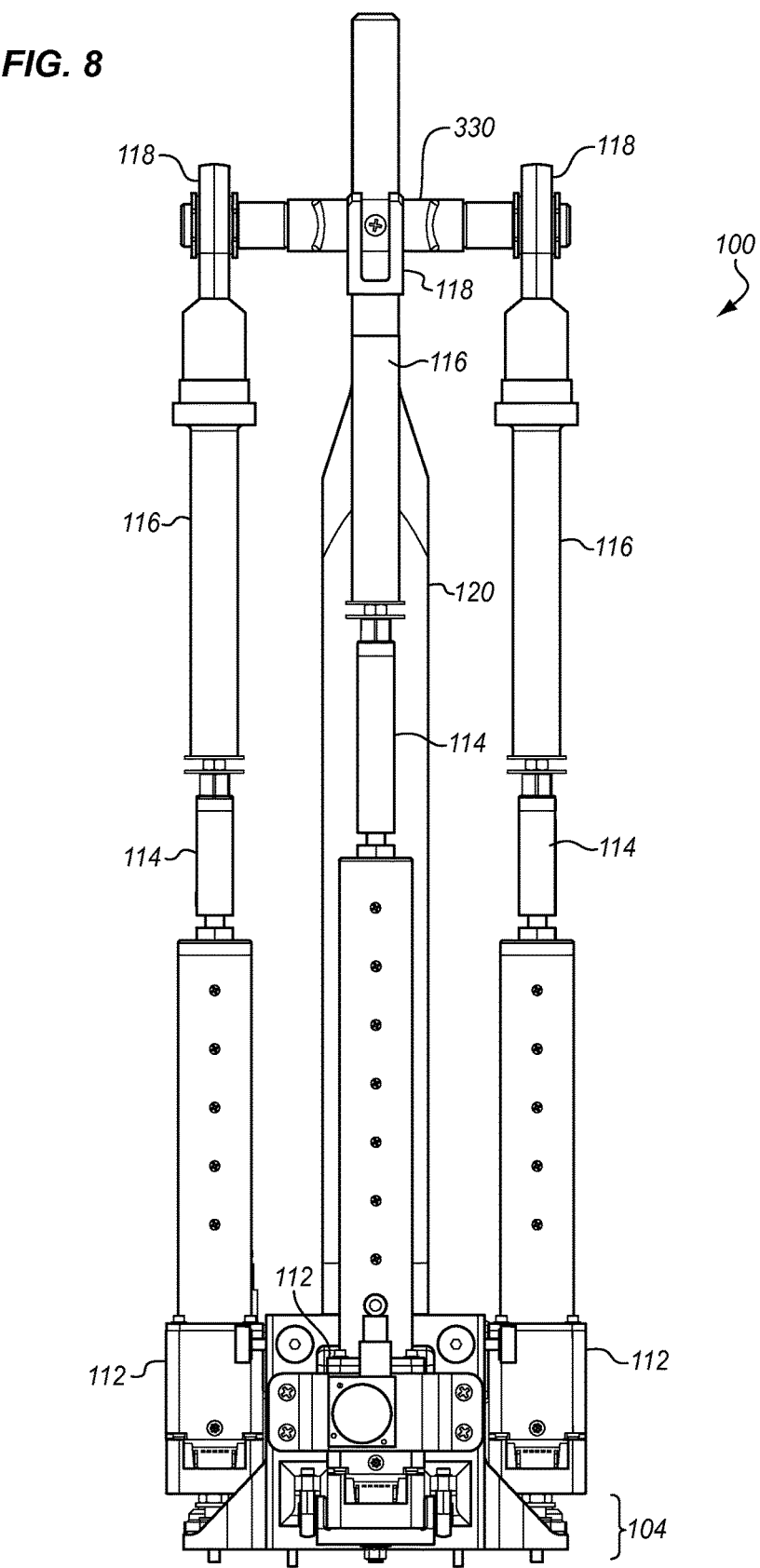
Figure 9:
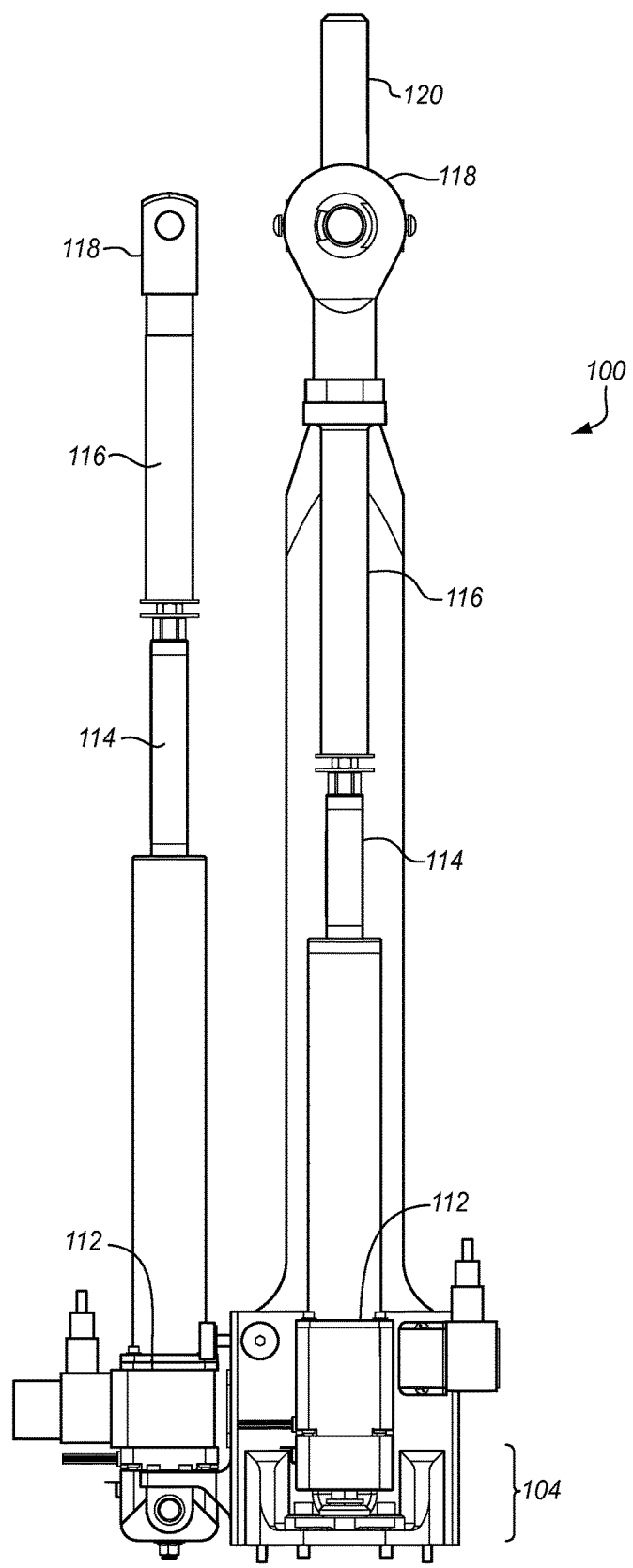
Figure 10:
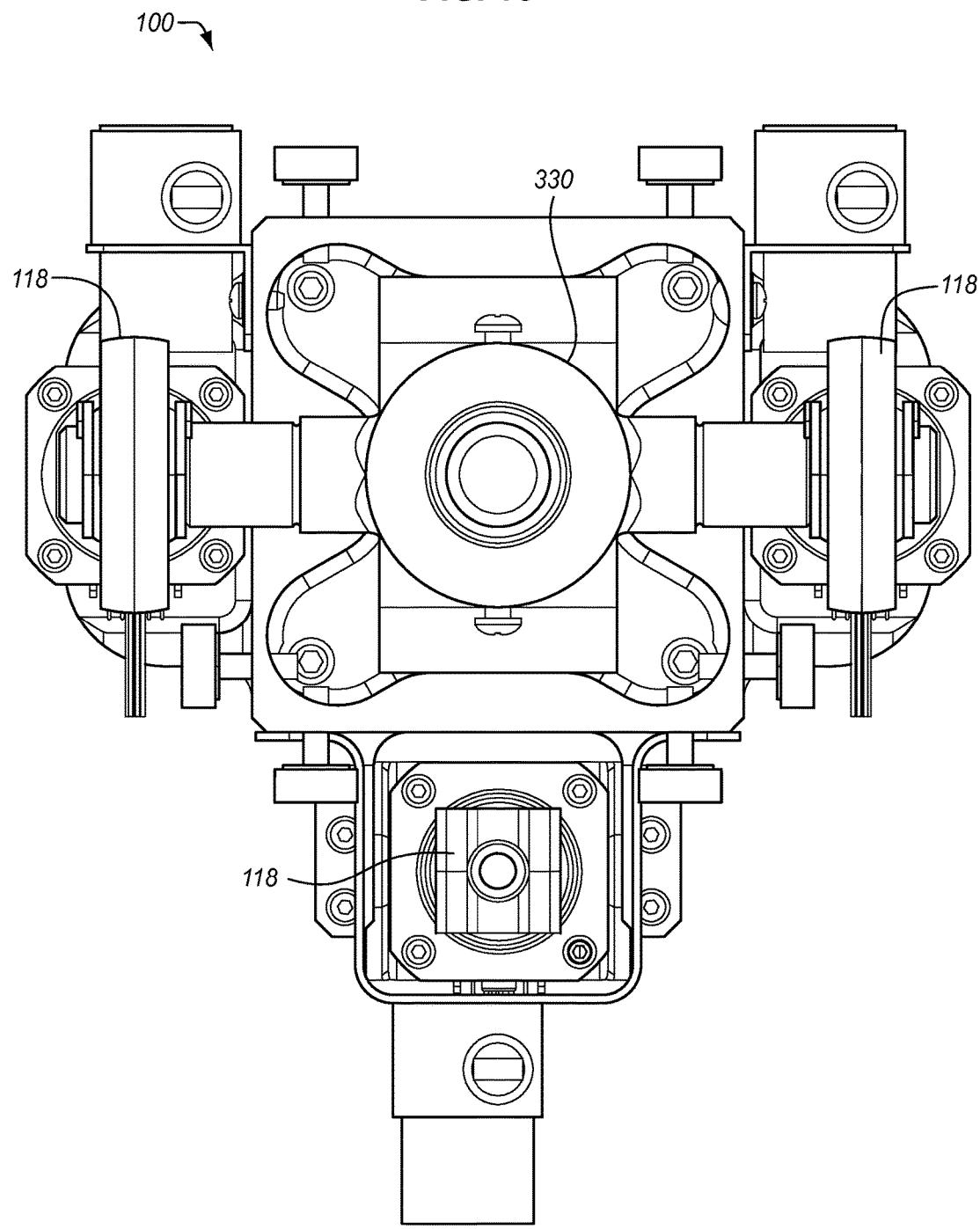

FIG. 1 is a block diagram of a Position Verification System (PVS) 10 in an exemplary embodiment. The PVS comprises any system, device, or component operable to controllably adjust the orientation and/or position of any device having one or more magnetic sensors. Specifically, PVS 100 allows for calibration of the device (e.g., helmet) to the environment in which it is to be deployed (e.g., a cockpit) while not affecting the unique magnetic environment where the device will be used.

The device calibrated by PVS 100 may use magnetic sensors in order to track its orientation/position in a room or other environment. For example, an aircraft cockpit may include multiple magnetic transmitters. An aircraft helmet may utilize its sensors to detect magnetic fields sourced by the transmitters and thereby determine its position/orientation within the cockpit. Similar techniques may be used to track the orientation/position of devices in aircraft simulators, in ground vehicles, or even in a room. However, because the magnetic environment of such locations varies (e.g., as new equipment is added to or removed), it is desirable to calibrate the magnetic sensors of the device by positioning the device into known locations and recording the input from the magnetic sensors of the device.

PVS 101 controllably adjusts both the position and orientation of helmet 400 in order to correlate known positions/orientations of helmet 400 with input from magnetic sensors 402. In this embodiment, PVS 101 is functionally divided into three portions. A mounting unit 300 mounts/attaches to helmet 400, such that when mounting unit 300 is elevated or rotated, it moves helmet 400. Meanwhile, drive unit 100, which is located beneath mounting unit 300, includes linkages with arms that are driven by linear actuators in order to change the position and/or rotation of mounting unit 300. In this embodiment, drive unit 100 is protected by a cover 102 that prevents the moving parts of drive unit 100 from harming or injuring an operator of PVS 101. PVS 101 further includes base unit 200, which uses motorized elements to adjust a horizontal location of PVS 101.

PVS 101 controllably adjusts a three dimensional position and orientation of helmet 400 in order to precisely calibrate a magnetic positioning system. Furthermore, motorized elements of PVS 101 are proximate to base unit 200 of PVS 101. Since the motorized elements are distal from sensors 402, the amount of electrical interference caused by these components when measurements are acquired via magnetic sensors 402 is reduced. To further reduce the number of artifacts generated during the calibration process, mounting unit 300 and parts of drive unit 100 include nonconductive components that further reduce the magnetic interference caused by PVS 101.

Nonconductive components are used in PVS 101 because conductive materials (including, for example, even carbon fiber) generate loop currents when magnetic transmitters are active. This means that even if the conductive components are not magnetic, the loop currents will generate magnetic interference in a testing environment. Reducing the magnetic footprint from a PVS is substantially beneficial, because otherwise the calibration performed by the PVS would include artifacts stemming from magnetic interference caused by the PVS itself.

FIGS. 2-6 are diagrams of a base unit 200 of PVS 101 in an exemplary embodiment. In this embodiment, base unit 200 is designed for mounting in a lower portion of a cockpit (e.g., in or near a seat location for a pilot), a simulator, etc. Base unit 200 includes mobile components that controllably adjust their horizontal position within PVS 101. Since drive unit 100 and mounting unit 300 are attached to these mobile components, base unit 200 may be used to move helmet 400 through an entire expected range of horizontal positions/locations (e.g., based on different expected seat positions for different pilots, based on different biometric properties of pilots, etc.).

Specifically, FIGS. 2-6 illustrate a perspective view, front view, side view, top view, and bottom view, respectively, of base unit 200. As shown in these FIGS., base unit 200 comprises a base 210, which includes a variety of spacers 212 intended to hold PVS 101 in position (e.g., in a cockpit of a simulator or an aircraft). Base 210 further includes one or more spring-loaded spacers that are retractable via a spring-loaded handle 214. This feature helps to facilitate the insertion and removal of base 210. A stage 220 (in this case, a track) is mounted within base 210. The length of stage 220 is parallel with a longitudinal axis of the cockpit, and is driven by a motor 223 forward and backward within the cockpit. In order to enable lateral motion of helmet 400, a lateral track 230 is mounted on a top portion of stage 220. Lateral track 230 is parallel with a lateral axis of the cockpit. Platform 240 is movably attached to lateral track 230, and is driven back and forth across lateral track 230 by a motor 232. Platform 240 may also be rotated in order to adjust a yaw of helmet 400 as desired by motor 221.

In this embodiment, an electronic interface 222 is mounted onto base unit 200, enabling an operator/technician to control helmet 400 during calibration by sending input to any combination of motors/actuators within PVS 101.

FIGS. 7-10 are diagrams of drive unit 100 of PVS 101 in an exemplary embodiment. Specifically, FIGS. 7-10 are perspective, front, side, and top views, respectively, of drive unit 100. In this embodiment, connector 104 of drive unit 100 is mounted onto platform 240 of FIGS. 2-6, meaning that the horizontal position of drive unit 100 (e.g., left/right, and forward/backward) is controllably adjustable by directing the motors of base unit 200.

In this embodiment, drive unit 100 includes three linkages that each include a nonconductive arm 116 coupled with a linear actuator 112 for driving a piston 114. Each linkage further includes an end portion 118 dimensioned for attachment to a component of mounting unit 300. The two linkages on the sides of drive unit 100 are each attached to arms of a swivel bearing 330 (shown for context), while the center linkage includes an end portion 118 dimensioned for attachment to a separate mounting point of mounting unit 300. Swivel bearing 330 includes a hollow center portion that is slidably attached to nonconductive, rigid center post 120. As shown in FIGS. 11-13, which are perspective, front, and top views of center post 120, center post 120 includes a rigid base portion 122, a beveled neck 124, and a top portion 126 along which swivel bearing 330 is able to slide.

Figure 14:
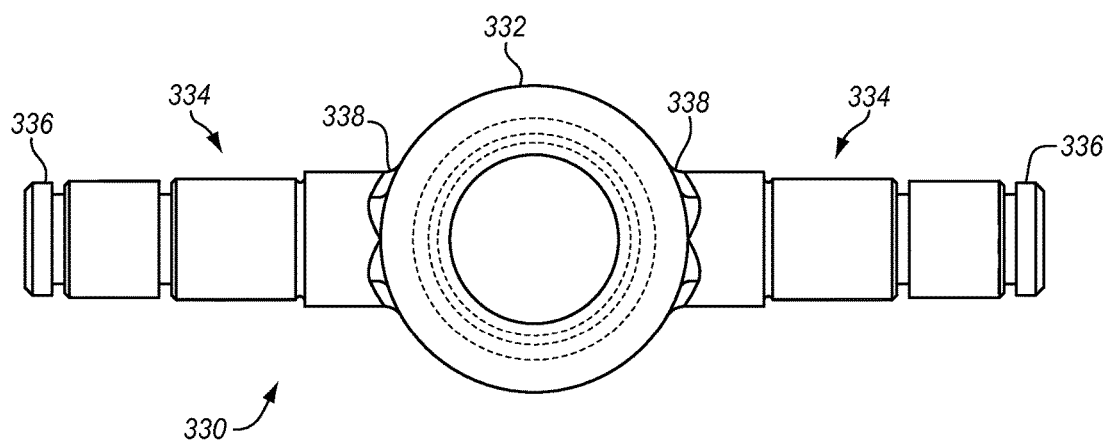
FIGS. 14-15 are diagrams of a swivel bearing in an exemplary embodiment.
Figure 15:
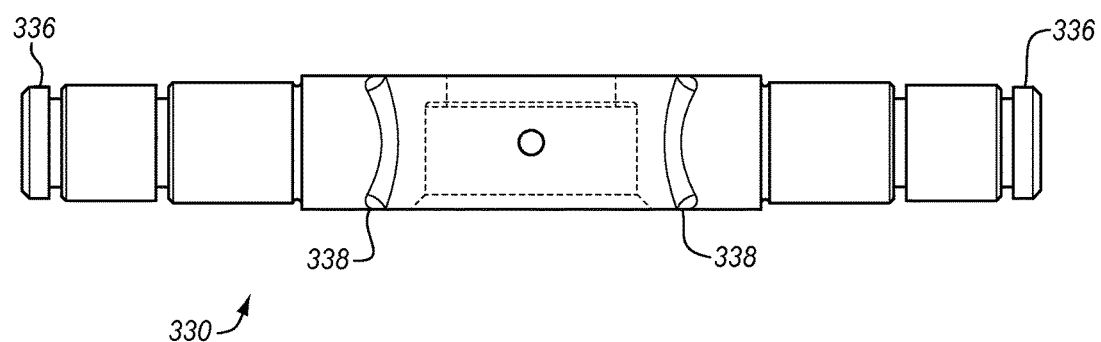

Swivel bearing 330 is further illustrated in FIGS. 14-15, which are top and front views, respectively, of swivel bearing 330. These FIGS. illustrate that swivel bearing 330 includes a center portion 332 for insertion onto center post 120, arms 334, and end portions 336, which protrude through end portions 118 of the linkages on the sides of PVS 101 when attached. In this embodiment swivel bearing 330 further comprises a beveled portion 338, to enhance the structural integrity of the connection between arms 334 and center portion 332.

Figure 16:
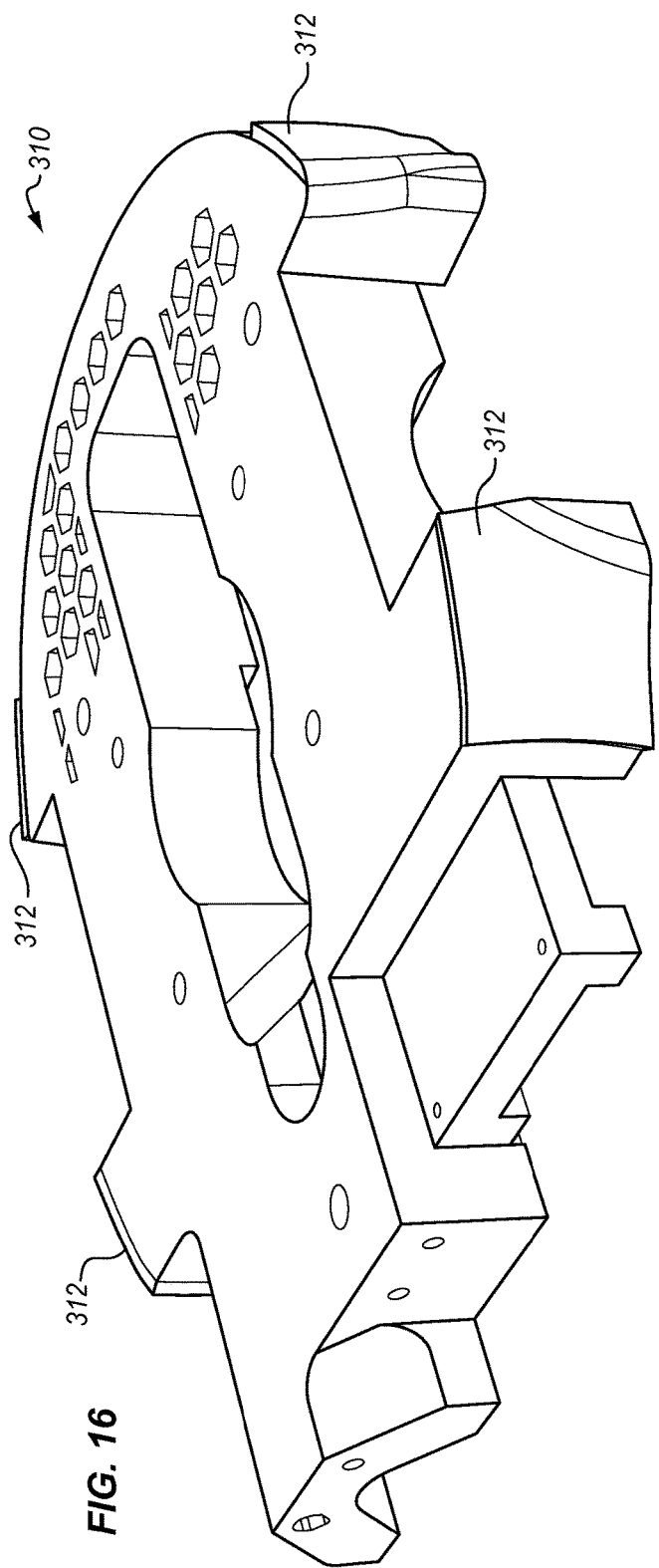
FIGS. 16-18 are diagrams of a mount for a position verification system in an exemplary embodiment.
Figure 17:
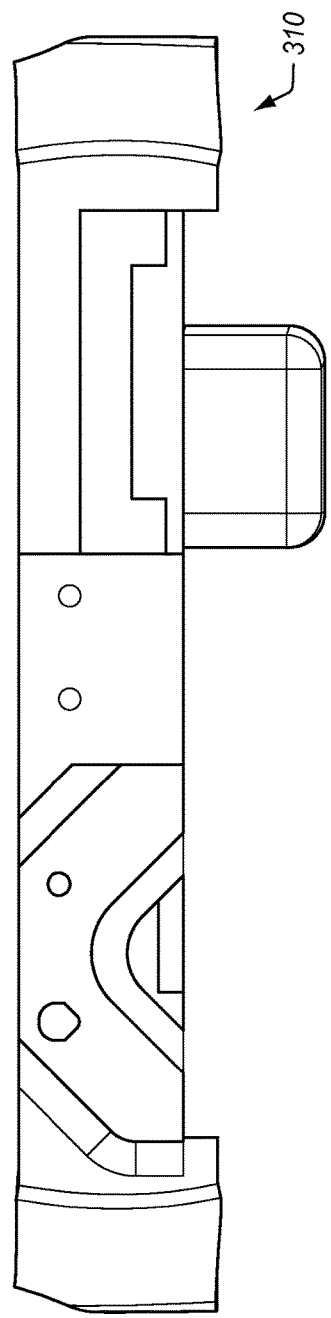
Figure 18:
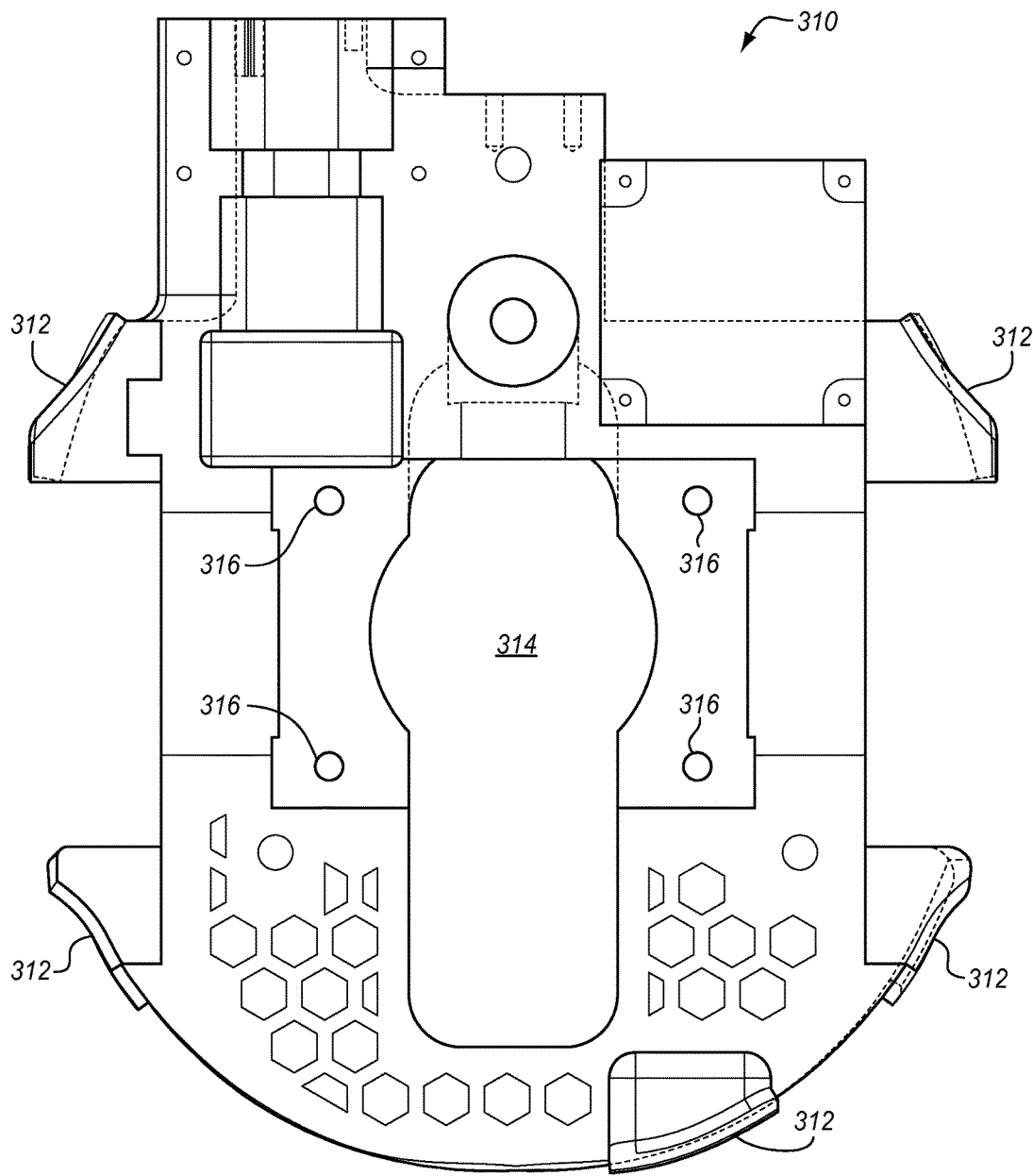

FIGS. 16-18 are perspective, side, and bottom diagrams, respectively, of a mount 310 for PVS 101 in an exemplary embodiment. Mount 310 is dimensioned/adapted to attach to helmet 400, such that rotation or translation applied to mount 310 is directly applied to helmet 400. In this embodiment, mount 310 includes multiple contoured features 312, which are formed to snugly fit an interior of helmet 400. Mount 310 also includes a substantially open portion 314, to enable swivel bearing 330 to freely rotate when mounted. In a further embodiment, mount 310 includes features (bolts, screws, adhesive pads, receptacles, etc.) that firmly attach it to helmet 400 during testing. For example, in one embodiment screws are driven through contoured features/pads 312 of mount 310 to secure helmet 400 onto mount 310. In this embodiment, as shown in FIG. 18 mount 310 also includes multiple receptacles 316 along its bottom portion for holding receivers 320 (described below), which capture and hold arms of swivel bearing 130 in position. Mount 310 is nonconductive, ensuring that it will not induce current loops when magnetic transmitters are activated during testing.

Figure 19:
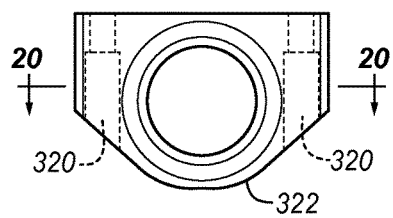
FIGS. 19-20 are diagrams of a receiver of a mounting unit for a position verification system in an exemplary embodiment.
Figure 20:
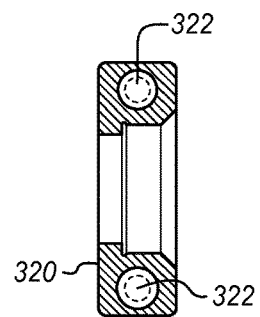

FIGS. 19-20 are diagrams of a receiver 320 for mount 310 of PVS 101 in an exemplary embodiment. As shown, receptacles 322 on each receiver 320 correspond with a pair of receptacles 316 on mount 310, allowing the fixation of each receiver 320 to mount 310, where each receiver may then receive an arm of swivel bearing 330.

Figure 21:
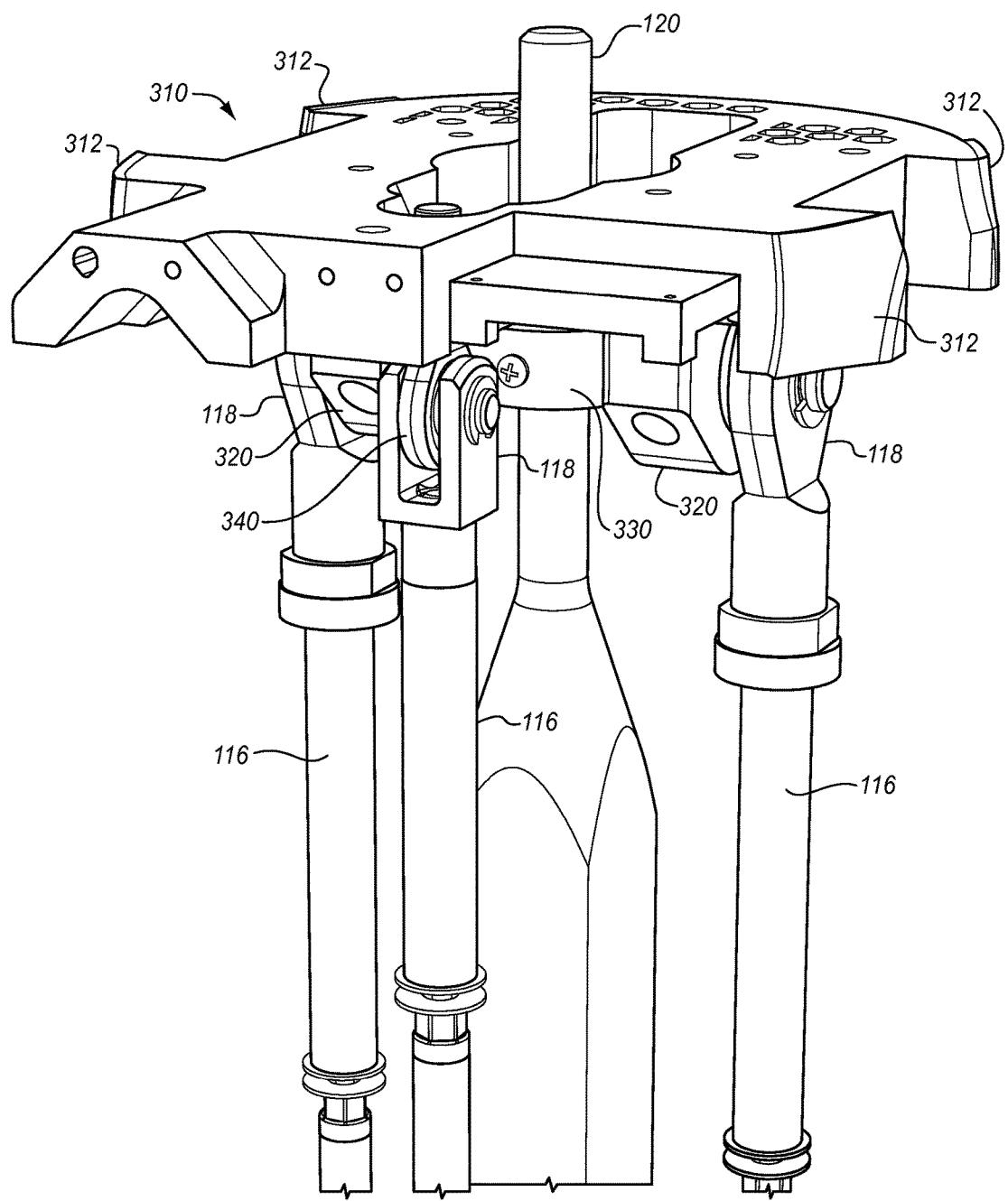
FIG. 21 is a diagram of a mounting unit positioned atop shafts of a position verification system in an exemplary embodiment.
Figure 22:
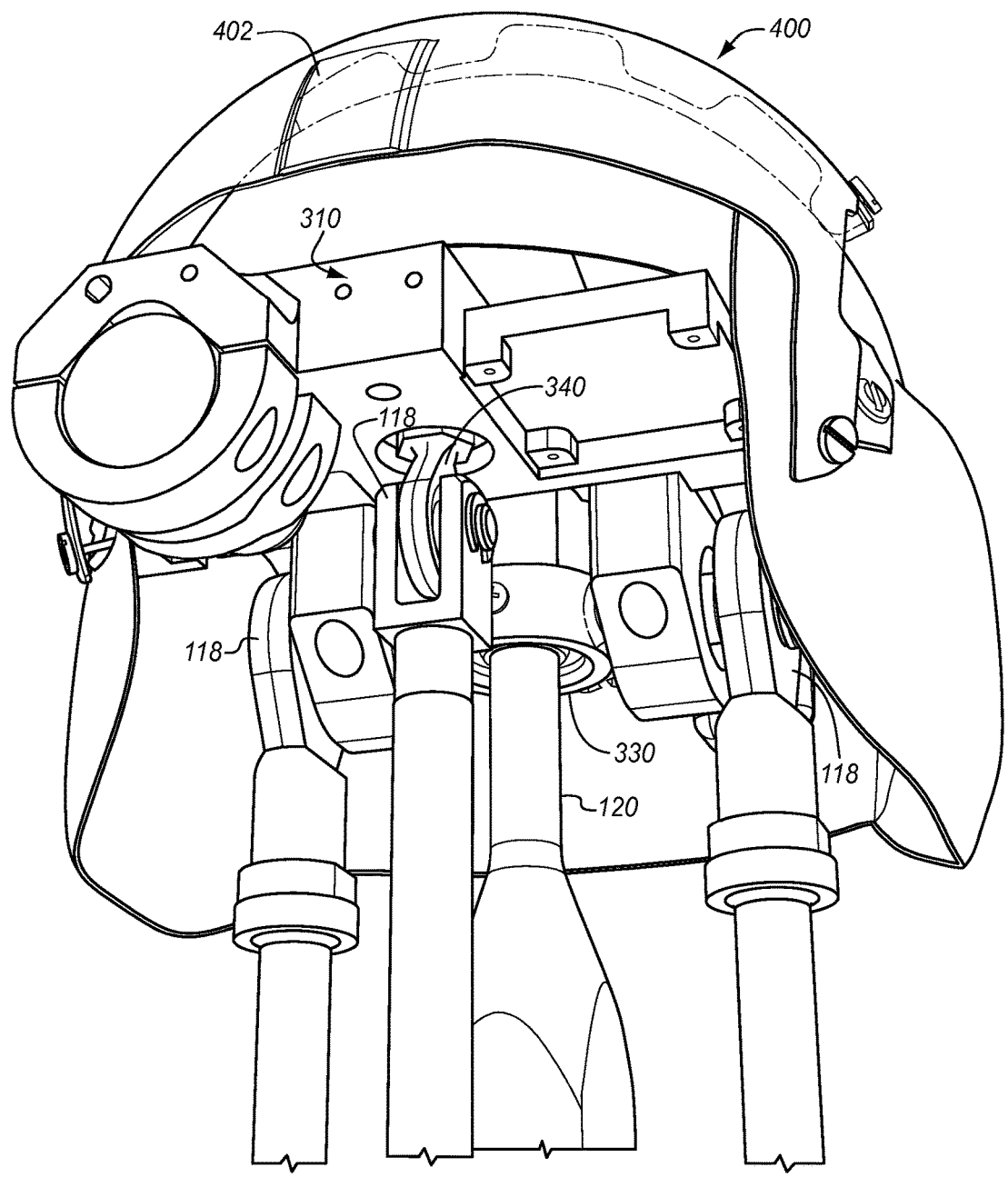
FIG. 22-25 are diagrams of a device attached to a position verification system in an exemplary embodiment.
Figure 23:
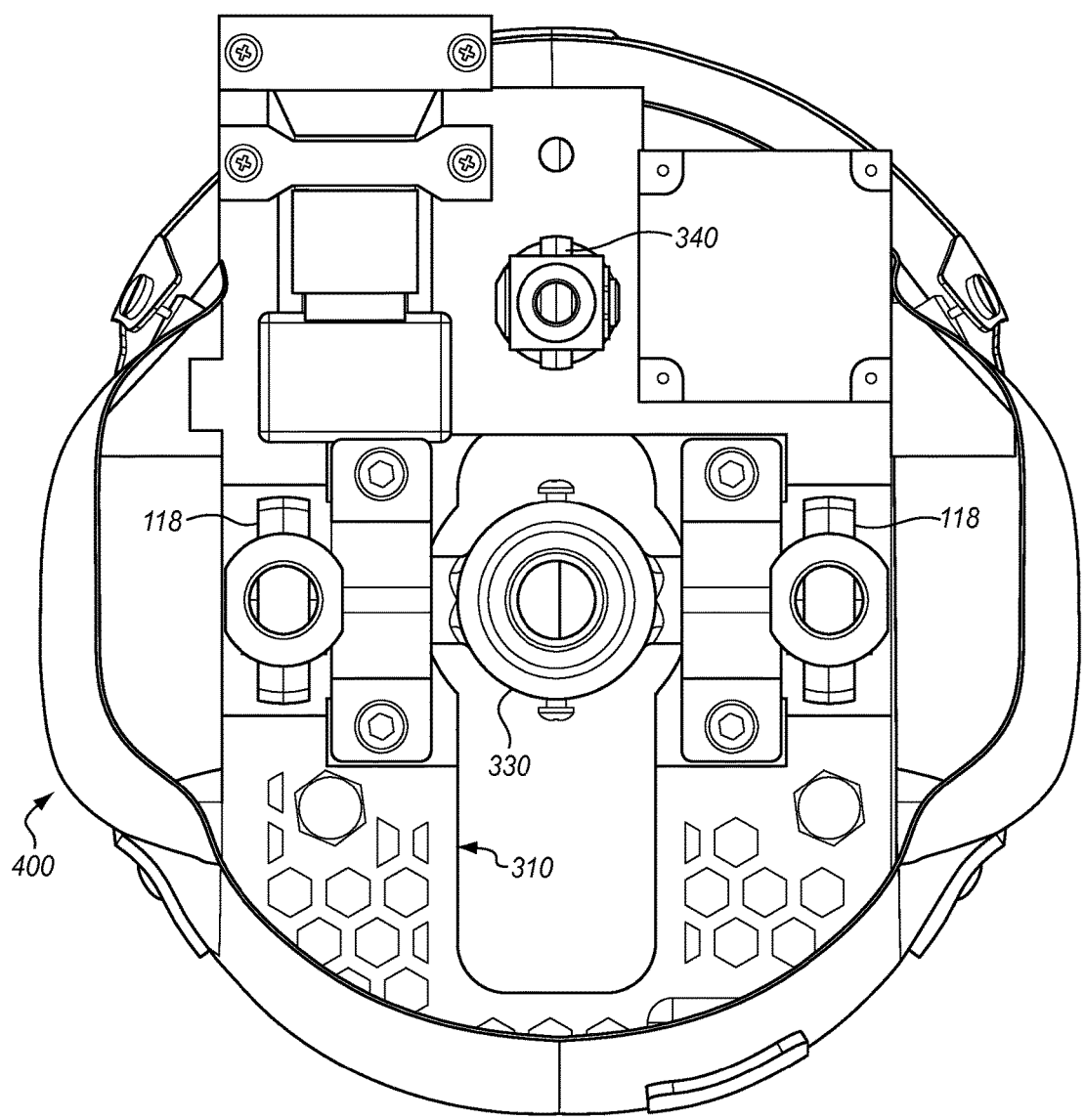
Figure 24:
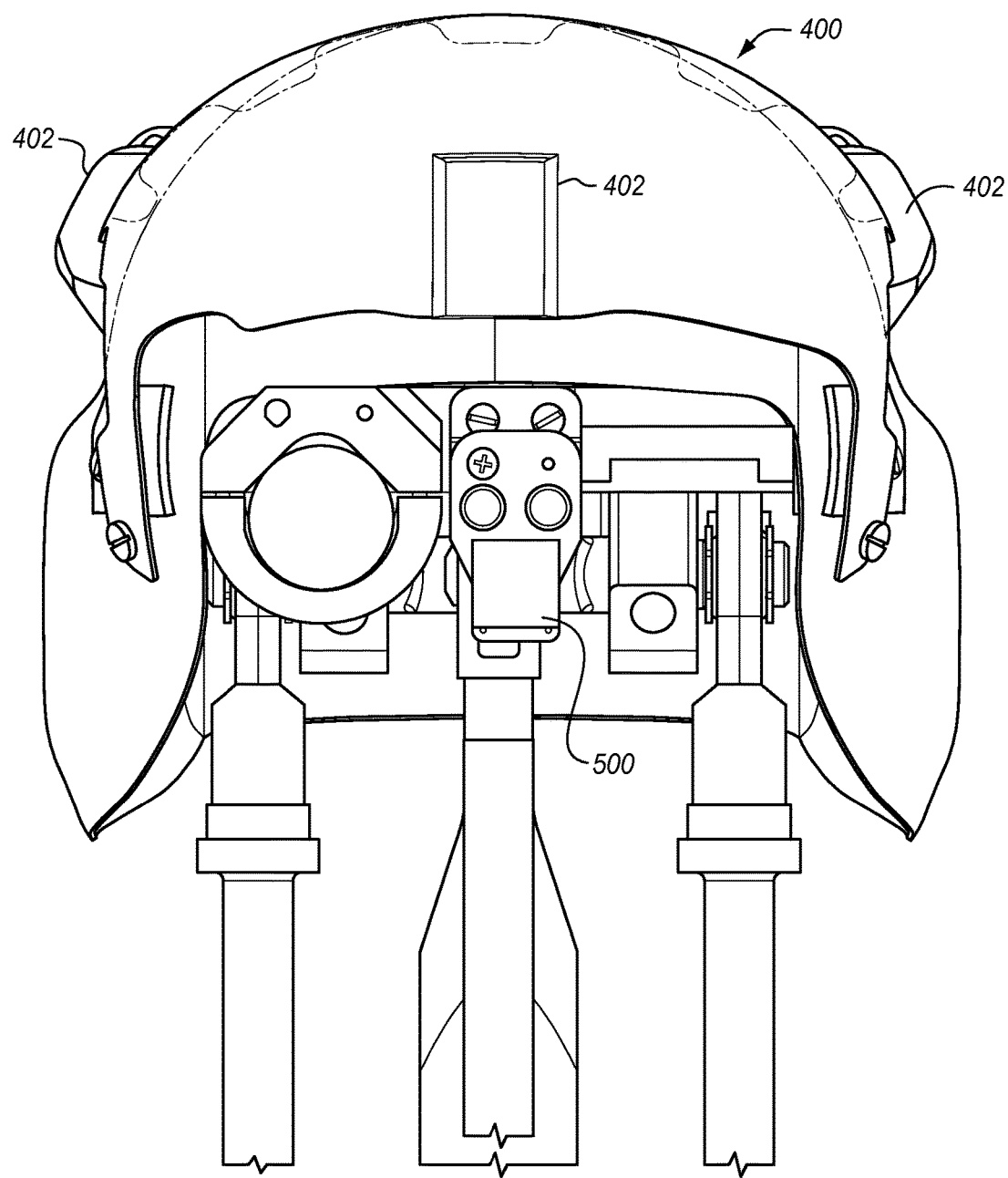

FIG. 21 is a diagram of mounting unit 300 positioned atop shafts 116 of PVS 101 in an exemplary embodiment. As depicted in FIG. 21, mounting unit 300 comprises mount 310, receivers 320, swivel arm 330, and mounting point 340. Mounting point 340 is dimensioned/adapted for attachment to an end portion 118 of the center linkage. The various components and linkages shown herein for mounting unit 300 and drive unit 100 ensure that vertical adjustments made by linear actuators 112 will adjust an orientation (e.g., pitch and roll) and/or vertical position of helmet 400, without imparting unexpected translation of helmet 400 in a horizontal direction.

Figure 25:
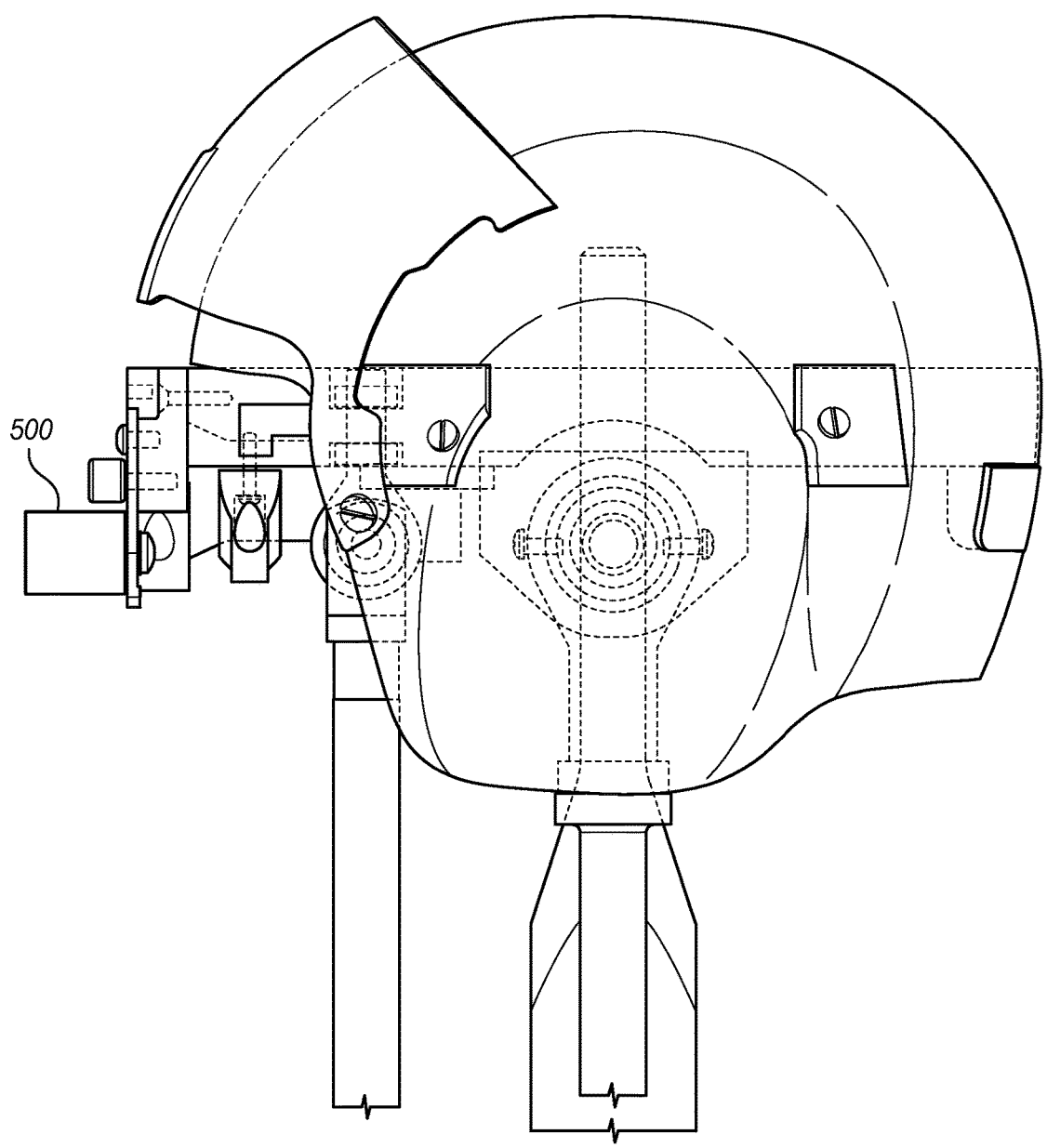

FIG. 22-25 are diagrams of helmet 400 attached to PVS 101 in an exemplary embodiment. Specifically, FIGS. 22-25 are perspective, bottom, front, and side views, respectively. In FIG. 25, an additional component has been added to PVS 101 in the form of camera 500. Camera 500 is capable of generating images from the viewpoint of helmet 400. These images may be analyzed to determine a position and/or orientation of helmet 400, in essence allowing for a PVS to itself be verified, before it is used to calibrate a magnetic positioning system. For example, the components of PVS 101 may be brought to a default position, and an image generated by camera 500 at the default position may be analyzed for an indication of tilt/rotation (e.g., based on the position/size/orientation of a known cockpit component in the image). This input and analysis is desirable to ensure that PVS 101 will precisely and accurate calibrate the magnetic positioning system used by helmet 400.

Figure 26:
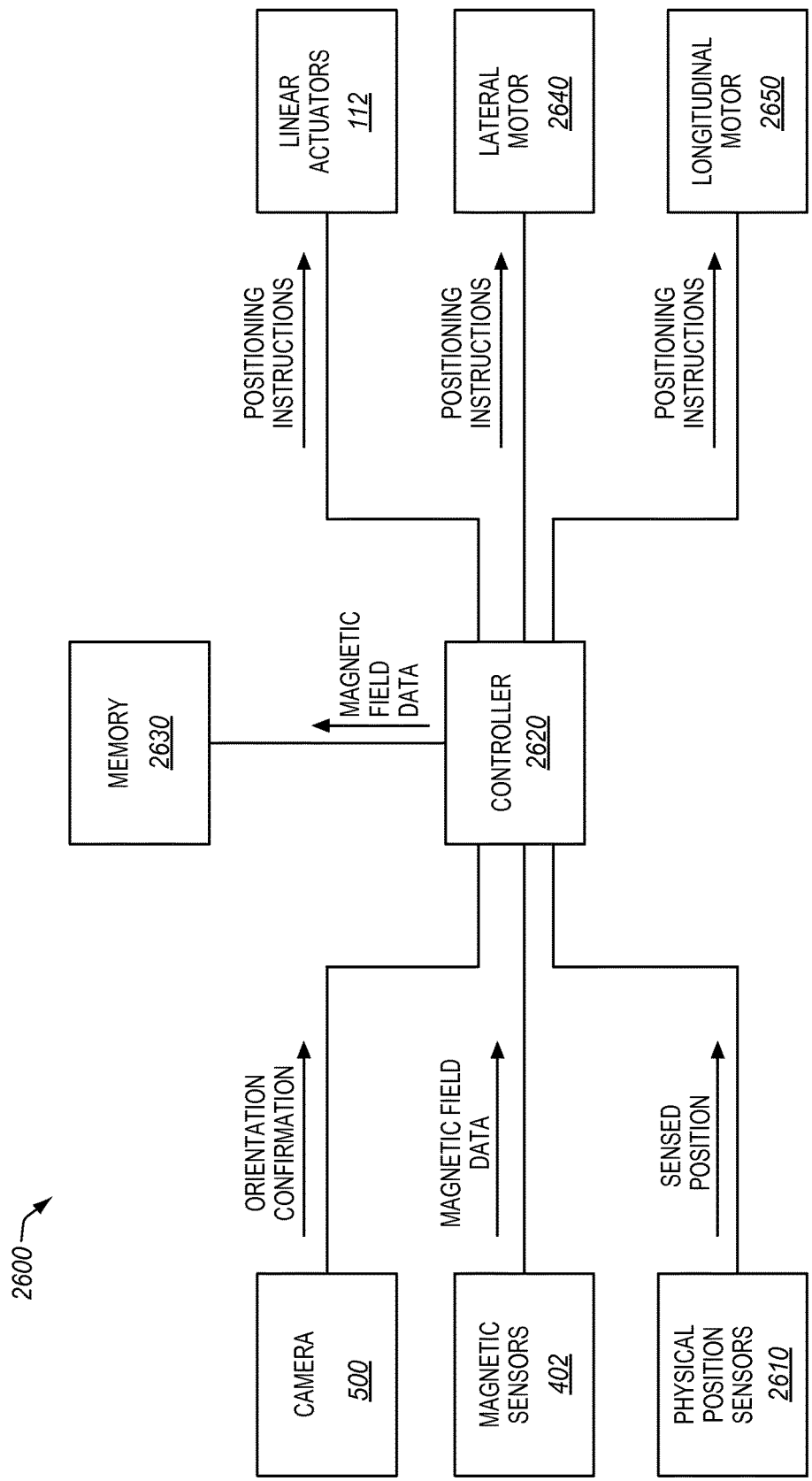
FIG. 26 is a block diagram of controllable components of a position verification system in an exemplary embodiment.

FIG. 26 is a block diagram 2600 of controllable components of a PVS in an exemplary embodiment. According to FIG. 26, a controller 2620 operates PVS 101 to drive helmet 400 through an entire range of known positions and/or orientations, and for each position/orientation, populates an entry in memory 2630. In this manner, the information in memory 2630 allows input from magnetic sensors 402 to be accurately interpreted when helmet 400 is being used as intended (e.g., when helmet 400 is being used by a pilot to operate a simulator or aircraft). For example, the information in memory 2630 may be used to coordinate/direct the position of components of a Heads-Up Display (HUD).

Controller 2620 sends positioning instructions to linear actuators 112, motor 2640, and motor 2650 in order to adjust the positions of components of PVS 101 and therefore adjust a position/orientation of helmet 400. In one embodiment, controller 2620 initiates by moving all motors and/or linear actuators to a default starting position/orientation, and then internally tracking each new position change to monitor the current position/orientation of helmet 400. In a further embodiment, a series of discrete position sensors 2610 are placed along the PVS, and report positional data back to controller 2620.

Controller 2620 is further operable to receive a measured input from magnetic sensors 402 of helmet 400, and to correlate the input in memory 2630 with known positions/orientations of helmet 400. Controller 2620 may be implemented as custom circuitry, as a processor executing programmed instructions stored in memory, or some combination thereof.

Figure 27:
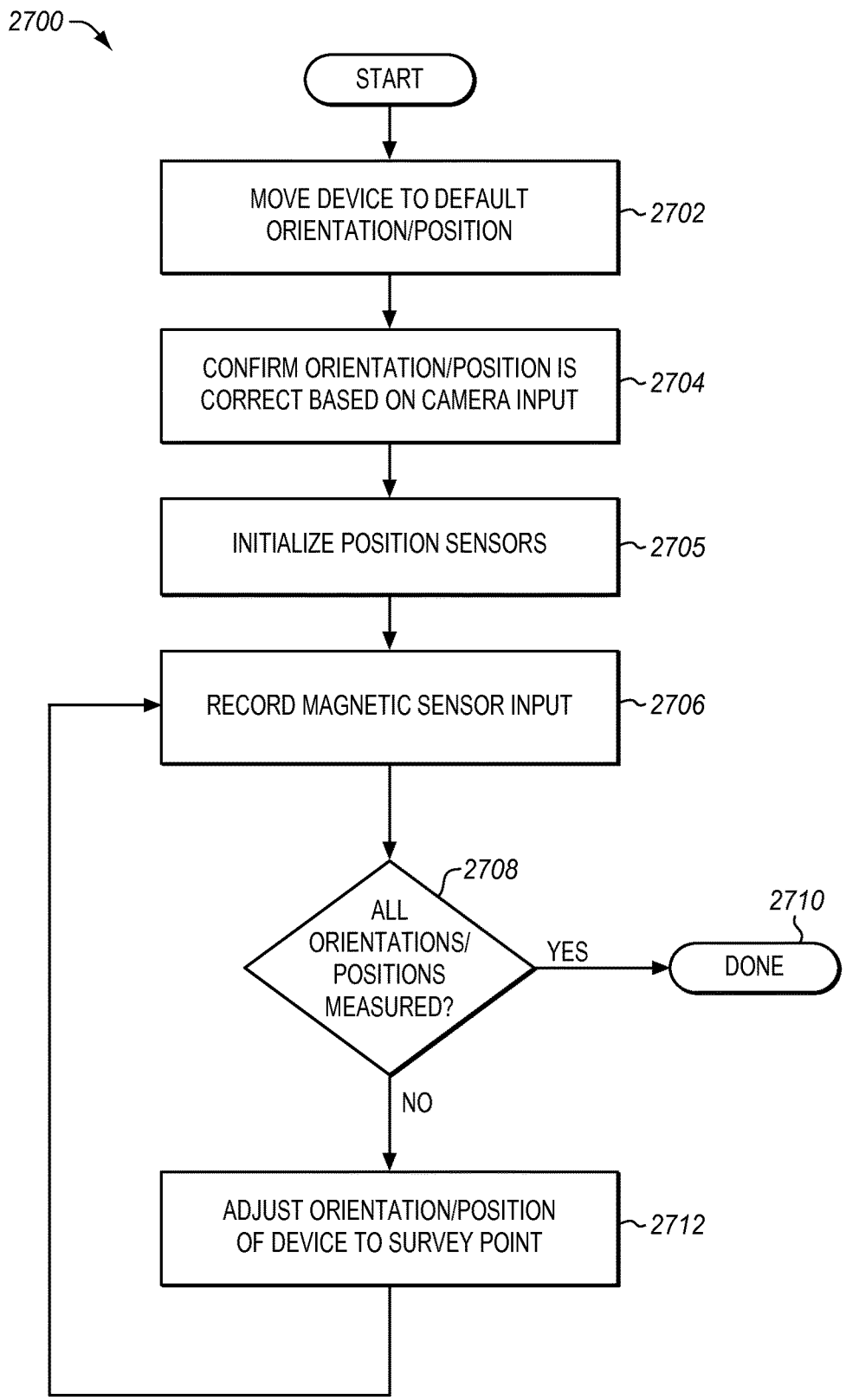
FIG. 27 is a flowchart illustrating a method for controlling a position verification system in an exemplary embodiment.

FIG. 27 is a flowchart illustrating a method 2700 for controlling a PVS in an exemplary embodiment. Assume, for this embodiment, that PVS 101 has been mounted into a cockpit location of an aircraft or simulator, and attached to helmet 400 for initial testing procedures. Further, assume that helmet 400 comprises three 3-axis magnetic sensors, and that three 3-axis magnetic transmitters are mounted within the cockpit and have been activated by controller 2620 to transmit magnetic pulses at thousands of kilohertz.

Controller 2620 initiates the process in step 2702, by instructing linear actuators 112, as well as motors 2640 and 2650, to move helmet 400 to a default orientation/position. Once PVS 101 has adjusted helmet 400 to the default orientation/position, controller 2620 acquires an image from camera 500. This image is reviewed by controller 2620 to identify cockpit features (e.g., a vertical calibration strip/line placed within the cockpit), which are analyzed to determine an actual orientation/position of helmet 400. If the actual position and/or orientation of helmet 400 as indicated by the image is consistent with the expected default position (e.g., based on a size and/or tilt of the cockpit features) in step 2704, processing continues to step 2706. However, if the image from camera 500 is not consistent with the expected default position/orientation, controller 2620 reports an error to an operator of PVS 101, allowing PVS 101 to be diagnosed, re-mounted, and/or adjusted properly. In one embodiment, the error report indicates the current position/orientation of helmet 400 as indicated by the image, as well as a difference between the current position/orientation and the default position/orientation. In a further embodiment, controller 2620 utilizes feedback from camera 500 in order to automatically adjust the position and rotation of helmet 400 from its actual position/orientation to the expected default position/orientation (e.g., by analyzing an image from camera 500 to determine a positional and rotational offset, and then performing displacement/rotation of helmet 400 to compensate for the detected offset).

In step 2705, since helmet 400 is now properly arranged in the expected default position, position/rotation sensors 2610 used by the actuators and motors of PVS 101 are initialized and zeroed, so that the input from these sensors 2610 will indicate the amount of deviation of helmet 400 from the default position when testing is in progress.

At this point in time, controller 2620 may cut power to camera 500, in order to ensure that camera 500 does not induce any loop currents during testing as helmet 400 is moved to various locations. In step 2706, controller 2620 records the 3-axis input from each of magnetic sensors 402 on helmet 400 into memory 2630, correlating the input with the known position and orientation of helmet 400.

The recorded magnetic sensor input stored in memory 2630 can be used to validate how the aircraft/simulator interprets input from magnetic sensors 402 (e.g., in order to ensure that the aircraft/simulator is properly interpreting the magnetic environment of the cockpit). To this end, if memory 2630 is a component of the aircraft/simulator, updating memory 2630 directly updates how the aircraft/simulator correlates input from sensors 402 with known positions/orientations of helmet 400. Alternatively, if memory 2630 is an independent component of PVS 101, then controller 2620 may provide data stored in memory 2630 to a computer of the aircraft/simulator (e.g., after input for each position has been recorded, after input for all positions has been recorded, etc.). The aircraft/simulator computer may then update its own correlations between orientation/position and sensor input, based on the information kept in memory 2630.

At this point in time, it may be desirable to move helmet 400 into new positions/orientations (known as "survey points"), or to instead stop the method. Thus, if the already-measured orientations/positions for helmet 400 fall within an entire expected range of motion of helmet 400 within the cockpit, then processing finishes at step 2710. For example, the range of motion may be discretized into a series of representative positions and/or orientations within a "motion box" for helmet 400, and magnetic sensor input may be recorded at each of these representative positions/orientations.

If further orientations/positions of helmet 400 remain, then controller 2620 directs the motors and linear actuators to move helmet 400 to a new position/orientation in step 2712, and proceeds to step 2706 to record the magnetic sensor input for the new position/orientation.

Figure 28:
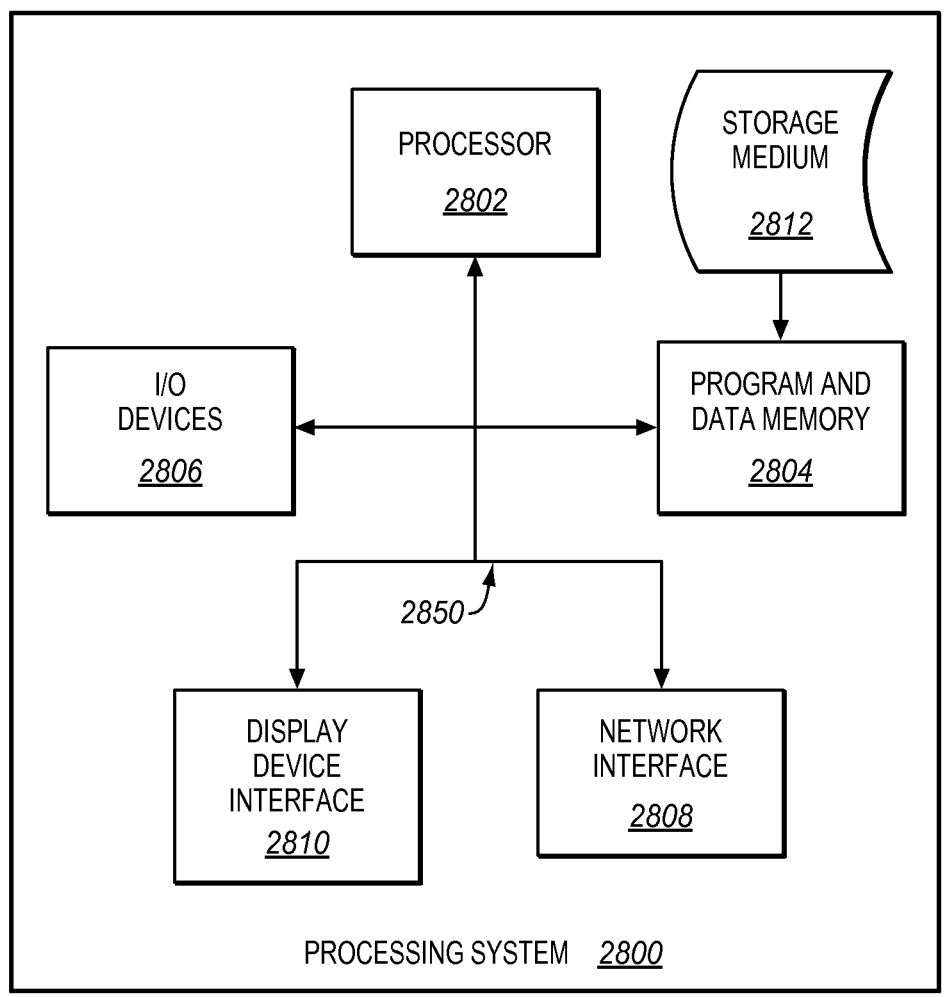
FIG. 28 illustrates a processing system operable to execute a computer readable medium embodying programmed instructions to perform desired functions in an exemplary embodiment.

In one particular embodiment, software is used to direct controller 2620 of PVS 101 to perform the various operations disclosed herein. FIG. 28 illustrates a processing system 2800 operable to execute a computer readable medium embodying programmed instructions to perform desired functions in an exemplary embodiment. Processing system 2800 is operable to perform the above operations by executing programmed instructions tangibly embodied on computer readable storage medium 2812. In this regard, embodiments of the invention can utilize a computer program accessible via computer-readable medium 2812 providing program code for use by a computer or any other instruction execution system. For the purposes of this description, computer readable storage medium 2812 is anything that stores the program for use by the computer.

Computer readable storage medium 2812 can be an electronic, magnetic, optical, electromagnetic, infrared, or semiconductor device. Examples of computer readable storage medium 2812 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 2800, being suitable for storing and/or executing the program code, includes at least one processor 2802 coupled to program and data memory 2804 through a system bus 2850. Program and data memory 2804 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 2806 (including but not limited to keyboards, displays, pointing devices, etc.) can be coupled either directly or through intervening I/O controllers. Network adapter interfaces 2808 may also be integrated with the system to enable processing system 2800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 2810 may be integrated with the system to interface to one or more display devices, such as printing systems and screens for presentation of data generated by processor 2802.

Although specific embodiments are described herein, the scope of the disclosure is not limited to those specific embodiments. The scope of the disclosure is defined by the following claims and any equivalents thereof.

The invention claimed is:

1. An apparatus comprising:
a mounting unit, adapted to mechanically couple with a device that includes a magnetic sensor, the mounting unit comprising:
a nonconductive mount adapted to attach to the device; and
a nonconductive swivel bearing comprising arms that are each rotatably attached to the mount;
a drive unit comprising:
a platform;
a nonconductive rigid post extending outward from the platform and attached to a center portion of the swivel bearing;
a plurality of linear actuators attached to the platform; and
a plurality of nonconductive shafts attached to the arms of the swivel bearing,
wherein each shaft is attached to a corresponding linear actuator for displacement by the corresponding actuator; and
a controller operable to direct the linear actuators to controllably adjust the plurality of nonconductive shafts in order to move the swivel bearing, thereby adjusting an orientation and position of the device.

2. The apparatus of claim 1, wherein:
when the apparatus is mounted in a cockpit that incorporates multiple magnetic transmitters, the controller is operable to: determine a known orientation and position of the device within the cockpit based on a position of each shaft, to receive an input from the magnetic sensor that is based on transmissions from the magnetic transmitters of the cockpit, and to correlate the known orientation and position with the received input in a memory.

3. The apparatus of claim 2, wherein:
the memory controls the placement of a Heads-Up Display (HUD) for the cockpit.

4. The apparatus of claim 2, wherein:
the controller is operable to iteratively adjust the orientation and position of the device, and correlate each orientation and position with an input from the magnetic sensor in the memory, until an entire expected range of motion of the device within the cockpit has been correlated in the memory.

5. The apparatus of claim 1, further comprising:
a camera that is attached to the device and is operable to transmit images to the controller, wherein the controller is operable to direct the linear actuators to move the device to an expected orientation and position, to analyze an image from the camera to determine an actual orientation and position of the device, and to report an error if the expected orientation and position does not match the actual orientation and position.

6. The apparatus of claim 1, further comprising:
a camera that is attached to the device and is operable to transmit images to the controller, wherein the controller is operable to direct the linear actuators to move the device to an expected orientation and position, to analyze an image from the camera to determine an actual orientation and position of the device, and to direct the linear actuators to move the device closer to the expected orientation and position if the expected orientation and position does not match the actual orientation and position.

7. The apparatus of claim 1, further comprising:
a base unit comprising:
  a base dimensioned for removable attachment to a lower portion of a cockpit;
  a stage coupled with the base and adapted for translation across the base along a longitudinal axis of the cockpit;
  a motor proximate to the stage and operable to drive the stage along the longitudinal axis;
  a lateral track affixed to a top portion of the stage, wherein a length of the lateral track is oriented parallel with the lateral axis of the cockpit; and
  a motor proximate to the lateral track and adapted to controllably drive the platform along the lateral track, wherein the platform is coupled with the lateral track.

8. The apparatus of claim 1, wherein:
the center of the swivel bearing is slidably attached to the rigid center post.

9. The apparatus of claim 1, wherein:
the linear actuators are each adapted to adjust an elevation of an arm of the swivel bearing, thereby tilting the swivel bearing on the rigid center post in order to adjust an orientation of the mounting unit.

10. The apparatus of claim 1, wherein:
the mounting unit further comprises a mounting point that is aligned with the center portion of the swivel bearing and is attached to an additional nonconductive shaft, wherein the drive unit further comprises:
the additional shaft, wherein the additional shaft is attached to a corresponding linear actuator for displacement, and wherein the linear actuator is adapted to adjust an elevation of the mounting point in order to adjust an orientation of the mounting unit along a different axis of rotation than the swivel bearing.

11. A method comprising:
a) directing a plurality of linear actuators to move a plurality of nonconductive shafts that are each attached via a mounting unit to a device that comprises a magnetic sensor, thereby moving the device into a default orientation and position;
b) analyzing input from a camera attached to the device in order to confirm that the device is at the default orientation and position;
c) recording input from the magnetic sensor in the memory and correlating the input with the orientation and position of the device; and
d) determining whether input for positions and orientations in an expected range of motion of the device have been recorded in the memory, wherein if input for positions and orientations in the expected range of motion have not yet been measured, the method further comprises:
e) directing the plurality of linear actuators to move the plurality of nonconductive shafts again, thereby moving the device into a new orientation and position; and
f) returning to step c).

12. The method of claim 11, further comprising:
determining a known orientation and position of the device based on a position of each shaft.

13. The method of claim 11, further comprising:
controlling the placement of a Heads-Up Display (HUD) for the cockpit based on contents of the memory.

14. The method of claim 11, wherein:
the camera is operable to transmit images for review, wherein the method further comprises:
directing the linear actuators to move the device to an expected orientation and position;
analyzing an image from the camera to determine an actual orientation and position of the device; and
reporting an error if the expected orientation and position does not match the actual orientation and position.

15. The method of claim 14, wherein:
the camera is operable to transmit images for review, wherein the method further comprises:
directing the linear actuators to move the device to an expected orientation and position;
analyzing an image from the camera to determine an actual orientation and position of the device; and
directing the linear actuators to move the device closer to the expected orientation and position if the expected orientation and position does not match the actual orientation and position.

16. The method of claim 11, further comprising:
operating each of the linear actuators to adjust an elevation of a corresponding arm of a swivel bearing that is mechanically coupled with the device.

17. An apparatus comprising:
a nonconductive mounting unit, adapted to mechanically couple with a device that includes a magnetic sensor;
a drive unit comprising:
  a plurality of nonconductive shafts attached to the mounting unit; and
  a plurality of linear actuators adapted to drive the nonconductive shafts; and a controller operable to direct the linear actuators to controllably adjust the plurality of nonconductive shafts, thereby adjusting an orientation and position of the device.

18. The apparatus of claim 17, wherein:

when the apparatus is mounted in a cockpit that incorporates multiple magnetic transmitters, the controller is operable to: determine a known orientation and position of the device within the cockpit based on a position of each shaft, to receive an input from the magnetic sensor that is based on transmissions from the magnetic transmitters of the cockpit, and to correlate the known orientation and position with the received input in a memory.

19. The apparatus of claim 18, wherein:

the memory controls the placement of a Heads-Up Display (HUD) for the cockpit.

20. The apparatus of claim 18, wherein:

the controller is operable to iteratively adjust the orientation and position of the device, and correlate each orientation and position with a measured input from the magnetic sensor in the memory, until an entire expected range of motion of the device within a cockpit has been correlated in the memory.

* * * * *